United States Patent
Timm et al.

(10) Patent No.: US 9,148,743 B2
(45) Date of Patent: Sep. 29, 2015

(54) WIRELESSLY PROVISIONING A VEHICLE TELEMATICS UNIT

(71) Applicant: General Motors LLC, Detroit, MI (US)

(72) Inventors: Mark J. Timm, Novi, MI (US); Timothy R. Nixon, Northville, MI (US)

(73) Assignee: General Motors LLC, Detroit, MI (US)

( * ) Notice: Subject to any disclaimer, the term of this patent is extended or adjusted under 35 U.S.C. 154(b) by 271 days.

(21) Appl. No.: 13/835,651

(22) Filed: Mar. 15, 2013

(65) Prior Publication Data

US 2014/0274016 A1 Sep. 18, 2014

(51) Int. Cl.
| | |
|---|---|
| *G06F 7/00* | (2006.01) |
| *H04W 4/00* | (2009.01) |
| *H04W 4/04* | (2009.01) |
| *H04L 29/08* | (2006.01) |

(52) U.S. Cl.
CPC .............. *H04W 4/001* (2013.01); *H04L 67/12* (2013.01); *H04L 67/34* (2013.01); *H04W 4/046* (2013.01)

(58) Field of Classification Search
None
See application file for complete search history.

(56) References Cited

U.S. PATENT DOCUMENTS

| | | | |
|---|---|---|---|
| 7,292,848 B2* | 11/2007 | Mazzara et al. | 455/419 |
| 7,463,951 B2 | 12/2008 | Ampunan et al. | |
| 7,599,843 B2 | 10/2009 | Watkins et al. | |
| 7,970,496 B2* | 6/2011 | Koepf et al. | 701/1 |
| 2004/0044592 A1* | 3/2004 | Ubik et al. | 705/28 |
| 2005/0164680 A1* | 7/2005 | Gould | 455/412.1 |
| 2005/0288986 A1* | 12/2005 | Barts et al. | 705/9 |
| 2006/0052092 A1* | 3/2006 | Schwinke et al. | 455/415 |
| 2006/0292984 A1* | 12/2006 | Teate et al. | 455/41.2 |
| 2007/0073450 A1* | 3/2007 | Ampunan et al. | 701/1 |
| 2007/0244628 A1* | 10/2007 | Rockett et al. | 701/117 |
| 2008/0021714 A1* | 1/2008 | Kraez et al. | 705/1 |
| 2008/0262885 A1* | 10/2008 | Jain et al. | 705/7 |
| 2009/0247153 A1* | 10/2009 | Haralson et al. | 455/432.1 |
| 2010/0094482 A1* | 4/2010 | Schofield et al. | 701/2 |
| 2010/0185524 A1* | 7/2010 | Watkins et al. | 705/22 |
| 2010/0250446 A1* | 9/2010 | Mackenzie et al. | 705/80 |
| 2012/0253551 A1* | 10/2012 | Halimi et al. | 701/1 |
| 2013/0211870 A1* | 8/2013 | Lawson et al. | 705/7.25 |
| 2014/0012634 A1* | 1/2014 | Pearlman et al. | 705/7.42 |

* cited by examiner

*Primary Examiner* — Calvin Cheung
(74) *Attorney, Agent, or Firm* — Anthony Luke Simon; Reising Ethington P.C.

(57) ABSTRACT

A system and method for wirelessly configuring vehicle electronics prior to delivery of the vehicle to a customer. The method carried out by the system includes (a) receiving a notification at a central facility indicating that a vehicle has been delivered to a dealership; (b) receiving a data message from a vehicle telematics unit installed on the vehicle while the vehicle is in a logistics mode (LM); and (c) terminating the logistics mode and/or initiating provisioning of the vehicle telematics unit using the established data connection.

18 Claims, 2 Drawing Sheets

WIRELESSLY PROVISIONING A VEHICLE TELEMATICS UNIT

TECHNICAL FIELD

The present invention relates generally to vehicles and more particularly to wirelessly provisioning a vehicle telematics unit.

BACKGROUND OF THE INVENTION

Provisioning is a well known process used to activate and configure a wireless device for use on a cellular network so that it can be used by a customer to place and receive calls. This process includes, for example, assigning a mobile identification number (MIN) or a mobile dialed number (MDN) to the cellular device, whether it be a mobile phone, vehicle telematics unit, or other cellular device. Vehicle telematics units are often installed in the vehicle as an OEM component, which allows the manufacturer to tightly integrate it in with other vehicle systems so as to provide a variety of diagnostic, information, entertainment, accessibility, and safety features as is by now well known. These telematics units can also be provided as an aftermarket device that is later installed by integrating it in with the other vehicle electronics to provide some or all of the same services as the OEM-installed devices.

For various reasons, provisioning of the telematics unit may not be able to be done or preferably is not done at the time of manufacturing, but rather only after delivery to the geographic destination (e.g., dealership) at which it will be delivered to its first customer. This initial destination may be another city within the same country of origin as the vehicle, or may be overseas from where it was manufactured. Although provisioning may not be carried out until the vehicle reaches the dealership, it nonetheless is preferably done prior to delivery of the vehicle to the customer so that the customer will have immediate use of the telematics unit upon taking delivery. By provisioning prior to customer delivery, then upon initial use of the telematics unit by the customer (e.g., by pressing a button on the telematics unit to inquire about or initiate the telematics services available), the telematics unit will ready to deliver services. This provides an improved customer experience and can permit, for example, a welcoming call to be provided to the user upon this first button press of the telematics unit. However, some vehicles may not be properly provisioned before delivery to the customer and as a result the telematics unit could fail to provide the full range of services.

SUMMARY OF THE INVENTION

According to an aspect of the invention, there is provided a method of wirelessly configuring vehicle electronics prior to delivery of the vehicle to a customer. The method includes the steps of: (a) receiving a notification at a central facility indicating that a vehicle has been delivered to a dealership; (b) receiving a data message from a vehicle telematics unit installed on the vehicle while the vehicle is in a logistics mode (LM); and (c) initiating provisioning of the vehicle telematics unit using the established data connection.

According to another aspect of the invention, there is provided a method of wirelessly configuring vehicle electronics prior to delivery of the vehicle to a customer. The method includes the steps of: (a) placing a manufactured vehicle into a logistics mode and initiating transportation of the vehicle to a dealership, wherein the logistics mode differs from a standard mode of the vehicle such that one or more vehicle system modules that are powered during an ignition OFF condition of the vehicle when in the normal mode are unpowered during the ignition OFF condition when in the logistics mode; (b) subsequently receiving from a vehicle telematics unit located at the vehicle a data message sent in response to a user-initiated event at the vehicle, the data message being received over a data connection; (c) determining based on the data message that the vehicle should be switched out of the logistics mode; and (d) sending a logistics mode termination command to the vehicle.

According to yet another aspect of the invention, there is provided another method of wirelessly configuring vehicle electronics prior to delivery of the vehicle to a customer. The method includes the steps of: (a) determining that a vehicle in a logistics mode (LM) has been delivered to a vehicle dealership; (b) detecting a change in a logistics mode status at the vehicle; (c) generating a packet data message based on the detected change in logistics mode status using a vehicle telematics unit installed on the vehicle; and (d) sending the packet data message from the vehicle telematics unit to a central facility.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENTS

The method described below involves wirelessly provisioning a vehicle based on a logistics mode (LM) status of the vehicle. Vehicles produced at manufacturing facilities can be placed in the LM to disable portions of vehicle functionality for shipment and/or storage. Some examples of how the LM can be implemented will be discussed in more detail below. After the vehicle dealer receives a shipment of vehicles, these vehicles can be provisioned. Provisioning can be done by the dealership as a part of its receipt and integration of the vehicle into its inventory. For example, a dealership will typically carry out various operations as a part of receiving and processing a new vehicle delivered from the manufacturer, such as alerting the vehicle manufacturer that the dealer has received the vehicle and switching the vehicle electronics out of the LM used for transporting the vehicle.

Apart from the dealer manually initiating and carrying out provisioning, the vehicle telematics unit can be directed to do so automatically following delivery to the dealership, such as in response to the vehicle being taken out of LM. This can include programming stored in a vehicle telematics unit that operates to respond to the LM being exited (e.g., a transport relay being switched on to power up the vehicle electronics) by placing a provisioning call from the telematics unit. Even if the dealer remembers to switch off LM, this action may not occur early enough before customer delivery to provide enough time and opportunity for the vehicle telematics unit to make the provisioning call and complete the process. Or the vehicle telematics unit may be unable to wirelessly contact a central facility to complete the provisioning process.

Sometimes, the LM can interfere with communications between the vehicle the central facility. For example, a dealer may overlook the LM status of the vehicle and forget to turn it off. In that case, the vehicle telematics unit carried by the vehicle may not be properly provisioned and/or be able to communicate with the central facility. In another example, the vehicle may have been placed in LM (accidentally or purposely) in such a way that interferes with communications between the vehicle and the central facility. To prevent each of these situations, the vehicle telematics unit can generate and send a packet data message from the vehicle telematics unit based on specific vehicle events, such as ignition switch actuation(s) or LM status changes. Using the packet data messages, the central facility can establish a packet data connection to carry out a variety of instructions, such as provisioning a vehicle or changing LM status.

Figure 1:
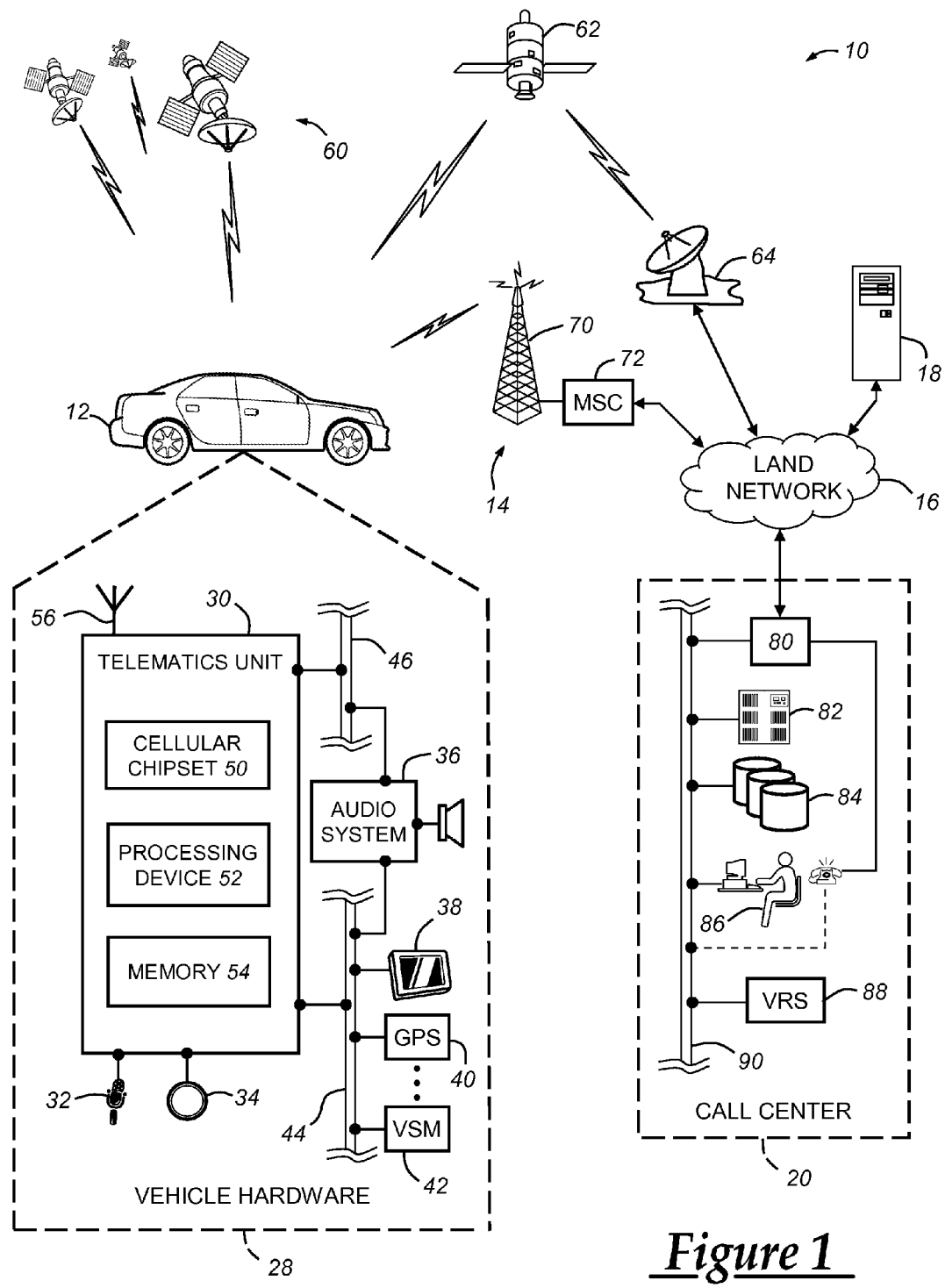
FIG. 1 is a block diagram depicting an exemplary embodiment of a communications system that is capable of using the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities.

In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead use VRS 88 as an automated advisor or, a combination of VRS 88 and the live advisor 86 can be used.

Figure 2:
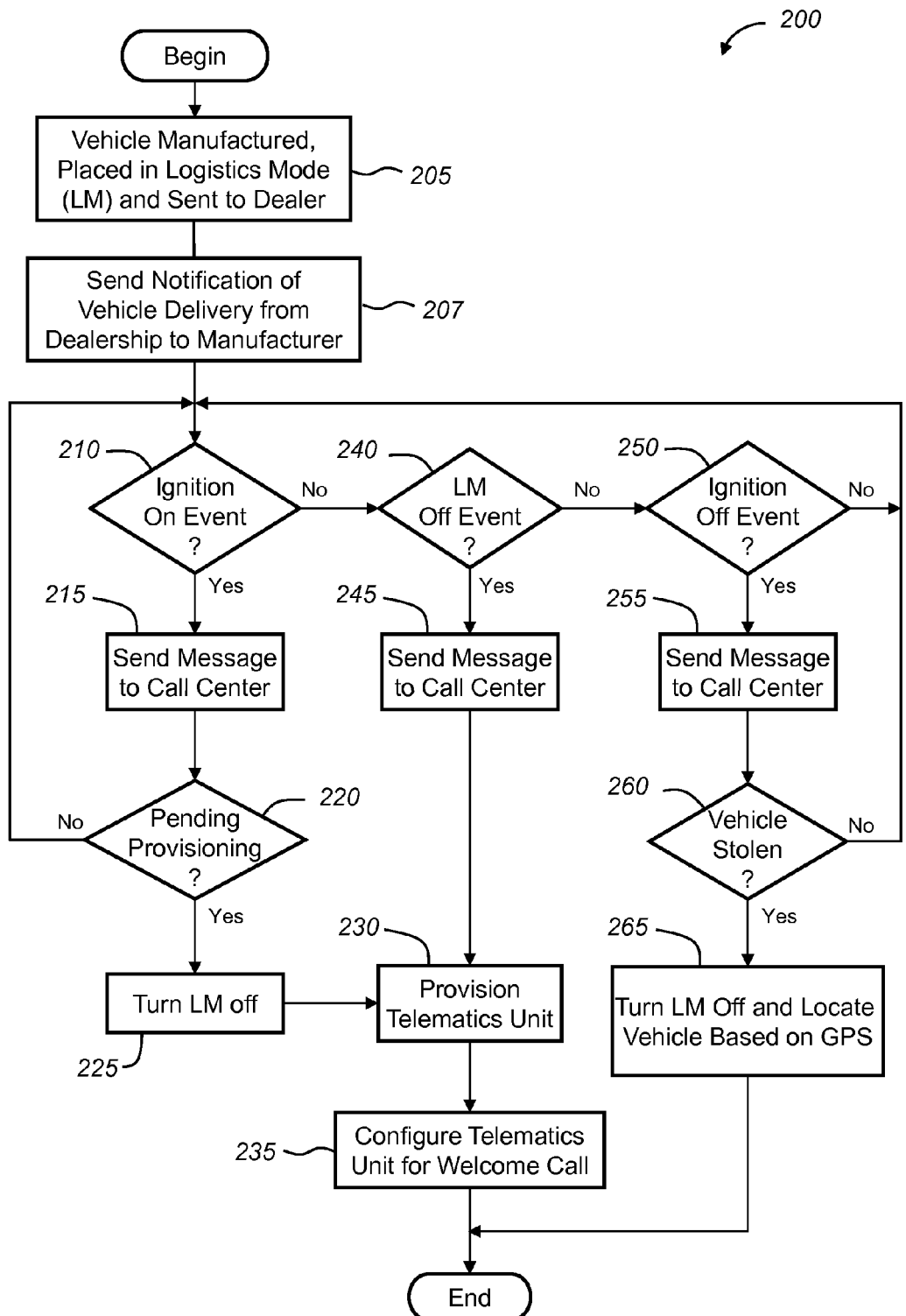
FIG. 2 is a flow chart depicting an embodiment of a method of provisioning a telematics unit in a vehicle.

Turning now to FIG. 2, there is shown an exemplary method 200 of wirelessly provisioning the vehicle telematics unit 30 of the vehicle 12. The method 200 begins at step 205 by manufacturing the vehicle 12 and placing the vehicle 12 in a logistics mode (LM) as part of the manufacturing process. Once the vehicle 12 is assembled, it can then be readied for shipment to its ultimate destination, such as a vehicle dealership. Before shipment, the vehicle 12 can be filled with a predetermined amount of fuel, covered with protection against environmental elements, and/or checked to ensure a certain level of battery charge as part of the readying process. Vehicles are shipped in a variety of ways that include railroad cars, ocean vessels, and trucks with trailers. Regardless of the means of shipment, the vehicle 12 may be in transit for an extended period of time. This period of time may depend on the mode of transportation and/or the destination. And during the shipment it is helpful to preserve the level of battery charge by disabling various vehicle modules that would normally draw power during ignition OFF.

To do so, the vehicle 12 can be placed in the LM. The LM can be a vehicle operational mode that regulates vehicle operation and can be implemented in a variety of ways. In one example, the LM can be a transport mode used to disable one or more of the elements collectively shown as vehicle electronics 28 in FIG. 1. In that case, the vehicle telematics unit 30 can be deactivated and prevented from consuming energy from the battery of the vehicle 12 and/or from initiating or receiving communications using the vehicle telematics unit 30 but for a limited number of data transmissions that the unit 30 can be programmed to send and receive. In another example, the LM can be designed for vehicle possession by the vehicle manufacturer and/or vehicle dealer before the sale of the vehicle 12 to its first owner so as to provide limited functionality of the vehicle 12 or vehicle systems. LM in this implementation can permit the vehicle telematics unit 30 to interact with the wireless carrier system 14 using non-geographic area code telephone numbers (e.g. 500 MIN numbers) to communicate with a central facility, such as the call center 20, while preventing the transmission and receipt of cellular calls. Since the LM is used during possession by the vehicle manufacturer/dealer, it may be used to also disable vehicle functions that record vehicle usage or other vehicle controls/monitors that are typically meant for the customer (e.g., the vehicle owner).

When the vehicle 12 is received at the vehicle dealership, the dealership can communicate a message to a central facility confirming receipt of the vehicle 12. This is shown in step 207. In one example, this can be carried out via a web delivery record (WDR) that is generated following vehicle delivery to a dealership. With regard to the WDR, a new vehicle 12 delivered to the dealership off an auto transport trailer can cause the dealer to record the vehicle receipt in its computer system in any suitable way, such as by scanning in or otherwise entering the vehicles' unique VIN(s). The WDR can then be sent electronically back to the manufacturer to inform it that the transported vehicle 12 has been received by the dealership. In this way or any other suitable way, the manufacturer may receive a notification at a central facility indicating that the vehicle has been delivered to the dealership. The use of WDRs and the programming at the dealership to generate and send this WDR, as well as at the manufacturer (e.g., the call center 20) to receive and record this WDR, will be apparent to those skilled in the art. The method 200 proceeds to step 210.

A number of determinations (e.g., vehicle events) can be made or detected after the vehicle 12 has been manufactured and placed in LM. At step 210, it is determined whether an ignition ON event has occurred at the vehicle 12. For example, the vehicle 12 can detect each time the ignition switch of the vehicle 12 has been activated or turned on as well as when the ignition switch has been deactivated or turned off. Each of the activations/deactivations can be detected by the vehicle telematics unit 30. The LM is implemented in such a manner to permit these detections and response by the telematics unit 30. If an ignition ON activation (event) occurs, then the method 200 proceeds to step 215 during which the vehicle telematics unit 30 can transmit a packet data message to a central facility, such as the call center 20 or a back office operation represented by computer 18 shown in FIG. 1. The packet data message can be generated based on the actuation of the ignition switch of the vehicle 12 during step 210. Actuation can include various operational uses of the ignition switch, such as turning the vehicle ignition switch to the "on" position, regardless of whether the engine of the vehicle 12 is ultimately started or not. However, activation of the vehicle ignition switch can also include starting and operating the engine of the vehicle 12. If an ignition ON event has not occurred, the method 200 proceeds to step 240.

In one embodiment, a data message is sent each time an ignition ON is detected. In other embodiments, it is possible to instruct the vehicle telematics unit 30 to monitor the number of actuations of the vehicle ignition switch and to only begin sending data messages after a certain number of activations have occurred. That is, the vehicle manufacturer can reasonably calculate an average number of times the vehicle ignition will be used to operate the vehicle 12 before delivery to the dealership. In one implementation, this average number can be twenty and the predetermined value can be set to twenty. Using that information, the vehicle telematics unit 30 can detect that the vehicle ignition switch has been used more than the calculated average number of times while the vehicle 12 is still placed in LM. When the number of actuations exceeds that predetermined value, then the vehicle telematics unit 30 can begin sending packet data messages to the central facility. Before the number of actuations exceeds the predetermined number, the vehicle telematics unit 30 can be prevented from sending packet data messages to conserve airtime charges. The method 200 proceeds to step 215.

Each of the transmitted packet data messages can include data useful to the central facility. For instance, the packet data message can include the identity of the vehicle 12, the fact that the vehicle is still in LM, the location of the vehicle, and/or other information relating to the operational status of the vehicle 12. After receiving the packet data message from the vehicle 12, the central facility can decide whether to engage in further data communication with the vehicle; for example, by using the packet data connection that was used to send the data message to the central facility or using another separate packet or other data connection originating from the central facility and terminating at the vehicle 12. The method 200 proceeds to step 220.

At step 220, it can be determined if a pending provisioning event for the vehicle 12 exists. The central facility can receive the packet data message at step 215 alerting the facility that the ignition switch of the vehicle 12 has been activated (e.g., turned on). In response to the received packet data message, the central facility may then determine whether the vehicle telematics unit 30 is in the process of being provisioned. The provisioning process can generally associate the vehicle telematics unit 30 with services provided by the wireless carrier system 14 and/or a telematics service provider. The method 200 proceeds to step 225.

If the central facility determines that the vehicle telematics unit 30 is in the process of being provisioned (i.e., provisioning is pending), the central facility can take the vehicle 12 out of LM at step 225. This can be accomplished using the packet data call or session initiated by the vehicle telematics unit 30 over which the unit 30 sent the packet data message alerting the central facility that the ignition of the vehicle 12 has been activated. Or a separate packet data call can be used. Using the packet data call, the central facility can transmit instructions that include a command to exit LM to the vehicle 12. The method 200 proceeds to step 230.

At step 230 the central facility can provision the vehicle telematics unit 30. This can be accomplished by sending a packetized instruction using the vehicle-originated packet data call commanding the vehicle telematics unit 30 to begin the provisioning process. That instruction can direct the vehicle telematics unit 30 to begin to provision itself through the wireless carrier system 14 via over-the-air-provisioning (OTAP) techniques. On in another example, the central facility can send an instruction including the identity of the vehicle 12 and/or the identity of the vehicle telematics unit 30 to the wireless carrier system 14 to begin provisioning. The central facility can provide account information and other information used by the vehicle telematics unit 30 to function with the wireless carrier system 14 as well as the call center 20. This information can include an MDN and other information about the purchaser of the vehicle 12, such as the geographical address of the purchaser.

In one example of how steps 215-230 can be carried out, the central facility can respond to the packet data message sent during step 215 by accessing the WDR for the vehicle 12. Based on the time of receipt and/or content of the WDR, the central facility can determine that provisioning of the vehicle telematics unit 30 is pending. The WDR can indicate that the vehicle dealer is in the possession of the vehicle 12 and it will likely will be sold to a customer soon. The packet data message sent during step 215 can alert the central facility that that vehicle 12 may be being readied for delivery based on detected ignition events. The packet data message may optionally include data indicating that the vehicle telematics unit 30 is not provisioned, or that fact may be determined at the central facility or by the wireless carrier system 14. After receiving the packet data message from the vehicle telematics unit 30, the central facility can determine that provisioning for a new customer is pending but not yet complete and maintain the packet data call over which the packet data message was sent from the vehicle 12. Using the maintained packet data call, the central facility can optionally activate the vehicle vehicle system modules that were dormant during the LM (step 225) and carry out the provisioning of the vehicle telematics unit 30 (step 230), which includes configuring the vehicle telematics unit 30 for a welcome call (step 235) that can greet the new vehicle owner.

Returning to step 210, if an ignition ON event is not detected, the vehicle telematics unit 30 can determine if the vehicle 12 has been switched out of the LM at step 240. After receiving the vehicle 12 placed in LM, the vehicle dealership may take the vehicle 12 out of LM so as to power up various vehicle electronic systems that were disabled during transport. The activation and deactivation of LM can be implemented using a transport relay that is set by the manufacturer to disconnect power to various vehicle systems during transport. The dealer can then take the vehicle out of LM in any suitable way, such as by switching the relay back on to power up the vehicle systems. Again, this feature may be useful for preserving battery state of charge during transportation and storage of the vehicle. The vehicle telematics unit 30 can be programmed to communicate the LM status of the vehicle 12 to the central facility via the packet data message as part of the limited functionality of the vehicle 12 or vehicle telematics unit 30 while operating in the LM. LM status can be determined by a trigger set in the vehicle telematics unit 30. When such a trigger indicates that the LM status of the vehicle 12 has changed, then a packet data message can be sent to the central facility at step 245.

At step 245, a packet data message is generated at the vehicle 12 (e.g., using the vehicle telematics unit 30) and received at the central facility, and this may be done in the same manner as is described in conjunction with step 215. In response to the packet data message, the central facility can determine that the vehicle 12 has been taken out of LM yet the vehicle telematics unit 30 has not been provisioned. The central facility can provision the vehicle telematics unit 30 and configure the unit 30 for the welcome call at step 235. For example, after delivery of the vehicle 12 to the vehicle dealership but before delivery to the customer, the vehicle 12 may have been taken out of LM but not yet provisioned. In this case, the vehicle telematics unit 30 can detect the removal of LM from the vehicle 12 and send a packet data message from the vehicle telematics unit 30 to the central facility. The central facility can then initiate provisioning of the vehicle telematics unit 30 at step 230 as described above. It should be appreciated that in this and other embodiments of method 200, the determination of whether a change in LM status can be carried out regardless of whether the vehicle 12 has been provisioned.

Returning to step 240, when the vehicle telematics unit 30 does not detect a change in the LM status of the vehicle 12 or the vehicle 12 remains in LM, the method 200 proceeds to step 250 and the telematics unit 30 determines whether an ignition OFF event has occurred. If the ignition OFF event is not detected, then the method 200 returns to step 210. However, if the vehicle telematics unit 30 detects that the ignition switch of the vehicle 12 has been turned off, a packet data message can be generated at the vehicle 12 (e.g., using the vehicle telematics unit 30) and received at the central facility at step 255 in a way similar to what is described with respect to steps 210 and 215. At step 255 the vehicle telematics unit 30 can send a packet data message to the central facility alerting the facility that the ignition of the vehicle 12 has been turned off or deactivated. It may be worthwhile to repeat that the packet data message can include a variety of information, one example of which is the GPS coordinates of the vehicle 12 unless such is not available due to the vehicle being in the LM. The method proceeds to step 260.

At step 260, the central facility can determine if the vehicle 12 has been stolen in response to receiving the packet data message at step 255. After leaving the manufacturer, but prior to delivery to a customer, the vehicle 12 may be unlawfully removed from the transport or vehicle dealership. The central facility can access a database of stolen vehicles provided by dealerships and/or law enforcement organizations. If the vehicle 12 is determined to be not stolen (e.g., the vehicle 12 is not included on the list) then the method returns to step 210. In contrast, if the vehicle 12 is determined to be stolen, locating the vehicle 12 may be easier using the services or functionality provided by the vehicle telematics unit 30 when out of LM. Thus, the vehicle 12 may be prevented from entering into or remaining in LM at step 265. Using the packet data call originating from the vehicle telematics unit 30 at step 255, the central facility can direct the telematics unit 30 to take the vehicle 12 out of LM thereby permitting full functioning of the telematics unit and on-board GPS. As a result, the vehicle 12/vehicle telematics unit 30 can then assist in vehicle tracking by reporting GPS coordinates of the vehicle to a central facility, such as the call center 20 or a PSAP, as the vehicle 12 moves. The stolen vehicle 12 can then be located and/or tracked. Also, if for some reason a change in the LM status is detected (for instance, a thief attempts to circumvent vehicle tracking by placing the vehicle 12 back in LM), the vehicle 12 can alert the central facility of this. For example, if the vehicle 12 were placed into LM, the vehicle telematics unit 30 can be programmed to generate a packet data message for transmission to the call center 20 alerting the center 20 of the LM status change. The method 200 then ends.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of wirelessly configuring vehicle electronics in a vehicle prior to delivery of the vehicle to a customer, comprising the steps of:
   (a) receiving a notification at a central facility indicating that a vehicle has been delivered to a dealership;
   (b) receiving a data message from a vehicle telematics unit installed on the vehicle while the vehicle is in a logistics mode (LM); and thereafter
   (c) initiating provisioning of the vehicle telematics unit on a cellular telephone system to thereby activate wireless communication services on the cellular telephone system for the vehicle telematics unit.

2. The method of claim 1, further comprising the step of determining that there is a pending provisioning for the vehicle telematics unit and wherein step (c) further comprises initiating provisioning in response to the determination of the pending provisioning.

3. The method of claim 1, further comprising the step of sending a logistics mode termination command to the vehicle following step (b) to switch the vehicle out of the logistics mode.

4. The method of claim 1, wherein step (a) further comprises receiving the notification in response to an ignition event.

5. The method of claim 1, wherein step (a) further comprises receiving the notification in response to detecting that the vehicle has been switched out of logistics mode.

6. The method of claim 1, wherein step (b) further comprises establishing a data connection with the vehicle telematics unit and receiving the data message over the data connection, and wherein the method further comprises maintaining the data connection after step (b) and carrying out step (c) over the maintained data connection.

7. The method of claim 1, wherein the vehicle is placed in the logistics mode prior to transportation of the vehicle to the dealership and wherein, when in the logistics mode, the vehicle maintains a plurality of vehicle system modules in a deactivated state until an ignition ON event occurs, then activates one or more of the plurality of vehicle system modules, and then again deactivates the one or more of the plurality of vehicle system modules following occurrence of a subsequent ignition OFF event.

8. The method of claim 1, wherein step (a) further comprises receiving a delivery notification from the dealership indicating that the vehicle has been associated with a customer, establishing an account associated with the customer, assigning a phone number, and establishing a pending provisioning for the telematics unit.

9. A method of wirelessly configuring vehicle electronics prior to delivery of the vehicle to a customer, comprising the steps of:
  (a) placing a manufactured vehicle into a logistics mode;
  (b) initiating transportation of the vehicle to a dealership, wherein the logistics mode differs from a standard mode of the vehicle such that one or more vehicle system modules that are powered during an ignition OFF condition of the vehicle when in the normal mode are unpowered during the ignition OFF condition when in the logistics mode;
  (c) subsequently receiving from a vehicle telematics unit located at the vehicle a data message sent in response to a user-initiated event at the vehicle, the data message being received over a data connection;
  (d) determining based on the data message that the vehicle should be switched out of the logistics mode; and
  (e) sending a logistics mode termination command to the vehicle.

10. The method of claim 9, further comprising the step of maintaining the data connection and sending the logistics mode termination command to the vehicle over the maintained data connection.

11. The method of claim 9, wherein step (d) further comprises determining that provisioning of the vehicle telematics unit is pending in response to the received packet data message; and initiating provisioning of the telematics unit.

12. The method of claim 9, wherein step (d) further comprises determining that the vehicle is stolen in response to the data message.

13. A method of wirelessly configuring vehicle electronics prior to delivery of the vehicle to a customer, comprising the steps of:
  (a) determining that a vehicle in a logistics mode (LM) has been delivered to a vehicle dealership;
  (b) detecting a change in a logistics mode status at the vehicle;
  (c) generating a packet data message based on the detected change in logistics mode status using a vehicle telematics unit installed on the vehicle; and
  (d) sending the packet data message from the vehicle telematics unit to a central facility.

14. The method of claim 13, further comprising the step of terminating the LM.

15. The method of claim 13, further comprising the steps of:
  determining that provisioning of the vehicle telematics unit is pending in response to the packet data message; and
  commanding the vehicle to terminate the LM.

16. The method of claim 13, further comprising the steps of:
  determining that the vehicle is stolen in response to the packet data message; and
  commanding the vehicle to terminate the LM.

17. The method of claim 13, further comprising the step of placing the vehicle in the LM as part of a vehicle manufacturing process.

18. The method of claim 13, wherein the LM further disables power to one or more vehicle system modules.

* * * * *